(12) United States Patent
Zheng (10) Patent No.: US 10,965,781 B2
(45) Date of Patent: Mar. 30, 2021

(54) METHOD AND SERVER FOR DISPLAYING ACCESS CONTENT (71) Applicant: ADVANCED NEW TECHNOLOGIES CO., LTD., Grand Cayman (KY)

(72) Inventor: Meiyue Zheng, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/872,209

(22) Filed: May 11, 2020

(65) Prior Publication Data

US 2020/0274950 A1 Aug. 27, 2020

Related U.S. Application Data (63) Continuation of application No. 15/529,843, filed as application No. PCT/CN2015/095838 on Nov. 27, 2015, now Pat. No. 10,693,999.

(30) Foreign Application Priority Data

Dec. 8, 2014 (CN) .......................... 201410746505.2

(51) Int. Cl.
*H04L 29/08* (2006.01)
*G06Q 30/06* (2012.01)
(Continued)

(52) U.S. Cl.
CPC ......... *H04L 67/36* (2013.01); *G06Q 30/0601* (2013.01); *G06Q 30/0641* (2013.01);
(Continued)

(58) Field of Classification Search
CPC ....... H04L 67/36; H04L 67/306; H04L 67/42; H04L 47/808; H04L 12/1403; G06Q 30/0601; G06Q 30/0641
(Continued)

(56) References Cited

U.S. PATENT DOCUMENTS 5,903,881 A 5/1999 Schrader et al.
6,327,574 B1 12/2001 Kramer et al.
(Continued)

FOREIGN PATENT DOCUMENTS

CN 101562538 A 10/2009
CN 102084386 A 6/2011
(Continued)

OTHER PUBLICATIONS

Examination Report for European Application No. 15868572.7 dated Feb. 3, 2020 (6 pages).
(Continued)

*Primary Examiner* — Kristie D Shingles (57) ABSTRACT

Methods, apparatuses, and devices, including computer programs encoded on computer storage media for displaying webpage content are provided. One of the methods includes: receiving an access request of a first user to access a webpage; determining webpage content according to the access request of the first user; determining a second user identifier comprised in the webpage content based on the webpage content; determining a presentation identifier from one or more presentation identifiers corresponding to the second user according to the determined second user identifier and the webpage content, wherein the one or more presentation identifiers are configured to identify the corresponding second user; and returning the webpage content to the first user, wherein the webpage content comprises the
(Continued)

determined presentation identifier corresponding to the determined second user identifier.

20 Claims, 3 Drawing Sheets

(51) Int. Cl.
*H04L 12/14* (2006.01)
*H04L 12/927* (2013.01)
*H04L 29/06* (2006.01)

(52) U.S. Cl.
CPC ........ *H04L 12/1403* (2013.01); *H04L 47/808* (2013.01); *H04L 67/306* (2013.01); *H04L 67/42* (2013.01)

(58) Field of Classification Search
USPC ....................................................... 709/219
See application file for complete search history.

(56) References Cited

U.S. PATENT DOCUMENTS

| | | | |
|---|---|---|---|
| 7,117,361 B1 | 10/2006 | Hild et al. | |
| 7,814,012 B2 | 10/2010 | Johnson | |
| 7,865,953 B1 | 1/2011 | Hsieh et al. | |
| 8,112,354 B2 | 2/2012 | Lalwani et al. | |
| 8,365,254 B2 | 1/2013 | Burke et al. | |
| 8,474,048 B2 | 6/2013 | Masood | |
| 8,577,813 B2* | 11/2013 | Weiss | G06F 21/35 705/76 |
| 8,849,693 B1* | 9/2014 | Koyfman | G06Q 30/02 705/14.1 |
| 9,152,779 B2 | 10/2015 | Fiske | |
| 2003/0023524 A1 | 1/2003 | Sugimoto et al. | |
| 2003/0225855 A1 | 12/2003 | Hamilton, II et al. | |
| 2006/0218088 A1 | 9/2006 | Flora et al. | |
| 2008/0040248 A1 | 2/2008 | Im | |
| 2008/0046980 A1 | 2/2008 | Peng | |
| 2008/0235187 A1 | 9/2008 | Gade et al. | |
| 2009/0070873 A1 | 3/2009 | McAfee et al. | |
| 2009/0276433 A1 | 11/2009 | Fosback et al. | |
| 2011/0191849 A1 | 8/2011 | Jayaraman et al. | |
| 2011/0276414 A1 | 11/2011 | Subbarao et al. | |
| 2012/0011564 A1 | 1/2012 | Osborn et al. | |
| 2012/0023593 A1 | 1/2012 | Puder et al. | |
| 2012/0047577 A1 | 2/2012 | Costinsky | |
| 2013/0054812 A1 | 2/2013 | DeCoteau | |
| 2013/0066959 A1 | 3/2013 | Brundage et al. | |
| 2014/0040628 A1 | 2/2014 | Fort et al. | |
| 2014/0325543 A1 | 10/2014 | Evans et al. | |
| 2014/0344224 A1 | 11/2014 | LeBert et al. | |
| 2015/0007034 A1* | 1/2015 | Xu | G06F 3/0484 715/730 |
| 2015/0007040 A1* | 1/2015 | Xu | G06F 3/0484 715/738 |
| 2015/0058986 A1 | 2/2015 | Zhao et al. | |

FOREIGN PATENT DOCUMENTS

| | | |
|---|---|---|
| CN | 102236661 A | 11/2011 |
| CN | 102339433 A | 2/2012 |
| CN | 102647417 A | 8/2012 |
| CN | 103533002 A | 1/2014 |
| EP | 1326179 A2 | 7/2003 |
| JP | 2003-044778 A | 2/2003 |
| JP | 2005-533327 A | 11/2005 |
| WO | 2004/008285 A2 | 1/2004 |
| WO | 2014/011365 A2 | 1/2014 |

OTHER PUBLICATIONS

Chinese First Office Action dated Jun. 5, 2018, issued in Chinese Application No. 201410746505.2 (12 pages).
Second Office Action dated Nov. 23, 2018, issued in related Chinese Application No. 201410746505.2, with English machine translation (14 pages).
Third Office Action dated Feb. 26, 2019, issued in related Chinese Application No. 201410746505.2, with English machine translation (15 pages).
First Office Action for Korean Application 10-2017-7016092, dated Sep. 27, 2018, 7 pages.
Office Action for Japanese Application No. 2017-548514, dated May 15, 2018, 6 pages.
Search Report for European Application No. 15868572.7, dated May 25, 2018, 8 pages.
International Search Report and Written Opinion for Application No. PCT/CN2015/095838, dated Mar. 4, 2016, 8 pages.
PCT International Preliminary Report on Patentability dated Jun. 22, 2017, issued in International Application No. PCT/CN2015/095838 (7 pages).
First Examination Report for Indian Application No. 201747018966 dated Jun. 26, 2020.
Supplementary Search for Chinese Application No. 201410746505. 2, dated Jan. 19, 2021, 1 page.

* cited by examiner

METHOD AND SERVER FOR DISPLAYING ACCESS CONTENT

CROSS-REFERENCE TO RELATED APPLICATIONS

This application is a continuation application of U.S. patent application Ser. No. 15/529,843 filed on May 25, 2017, which is a national phase application of International Application No. PCT/CN2015/095838, filed on Nov. 27, 2015. The PCT application claims priority to and benefits of Chinese Patent Application No. 201410746505.2 filed with China National Intellectual Property Administration (CNIPA) of the People's Republic of China on Dec. 8, 2014. The entire contents of all of the above-referenced applications are incorporated herein by reference.

TECHNICAL FIELD

The present application relates to the technical field of computers, and in particular, to a method and a server for displaying access content.

BACKGROUND ART

With the rapid development of the Internet, the Internet has become an indispensable part of people's life. For example, more and more people can check news through the Internet, communicate with others through the Internet, or even shop through the Internet. However, existing display manners lack variety; especially, when it comes to display of titles, titles displayed on different pages are generally the same, or a displayed title is very different from cognition of an accessing user, resulting in inaccurate information transmission. The user often finds it hard to accurately understand specific information in the access content, and on this premise, the user will often interrupt access or perform repeated access. In this way, the prior art not only has the disadvantage of inaccurate information transmission, but may also cause a resource waste for a computer system or an Internet system.

SUMMARY

Embodiments of the present application provide a method and a device for displaying access content, which are used to resolve the problem existing in the prior art that because information is inaccurately transmitted, a user may interrupt access or perform repeated access, causing a resource waste for a computer system or an Internet system.

According to one aspect, a method for displaying access content provided by an embodiment of the present application includes: receiving an access request of a first user; determining, according to the access request of the first user, access content requested by the first user; determining at least one second user identifier included in the access content; determining a presentation identifier corresponding to the second user according to the determined second user identifier; and returning the access content to the first user, where the access content includes the presentation identifier corresponding to the at least one second user identifier.

In this embodiment of the present application, access content requested by a first user is determined according to an access request of the first user, a presentation identifier corresponding to the second user identifier included in the access content is determined, and the access content is returned to the first user, so that a peer end displays the received presentation identifier, thereby improving accuracy of information transmission, reducing the occurrence of interrupted access or repeated access of a user due to inaccurate information transmission, and reducing the resource waste caused for a computer system or an Internet system.

Preferably, the determining a presentation identifier corresponding to the second user according to the determined second user identifier includes: determining a corresponding system identity code identifier according to the determined second user identifier; and determining the presentation identifier corresponding to the second user according to the determined system identity code identifier.

Because second user key information can be determined according to the system identity code identifier, displayed information is more accurate.

Preferably, the determining a presentation identifier corresponding to the second user according to the determined second user identifier includes: if one presentation identifier corresponding to the second user is determined according to the determined second user identifier, using the determined presentation identifier as the presentation identifier corresponding to the second user; and if multiple presentation identifiers corresponding to the second user are determined according to the determined second user identifier, determining a language of the access content that needs to be returned to the first user, and determining, according to a correspondence between languages of access content and presentation identifiers of the second user, a presentation identifier corresponding to the language of the access content that needs to be returned to the first user.

Because user multimedia information can be determined according to the language, displays in different languages are supported, which increases application scenarios.

Preferably, the access content further includes second user key information corresponding to the at least one second user identifier; and after the determining at least one second user identifier included in the access content and before the returning the access content to the first user, the method further includes: determining, according to a correspondence between a second user identifier and second user key information, the second user key information corresponding to the at least one second user identifier included in the access content.

Because the second user key information can be displayed in the access content, displayed information is more comprehensive.

Preferably, the method is applied to a payment system, and the second user is a merchant.

Preferably, the method is applied to a payment system, the system identity code identifier is information, which is allocated by the payment system to the second user, for identifying the second user.

According to another aspect, a server provided in an embodiment of the present application includes: a receiving module configured to receive an access request of a first user; an access determining module configured to determine, according to the access request of the first user, access content requested by the first user; a user identifier determining module configured to determine at least one second user identifier included in the access content; a presentation identifier determining module configured to determine a presentation identifier corresponding to the second user according to the determined second user identifier; and a sending module configured to return the access content to the first user, where the access content includes the presentation identifier corresponding to the at least one second user identifier.

Preferably, the presentation identifier determining module is specifically configured to: determine a corresponding system identity code identifier according to the determined second user identifier; and determine the presentation identifier corresponding to the second user according to the determined system identity code identifier.

Preferably, the presentation identifier determining module is specifically configured to: if one presentation identifier corresponding to the second user is determined according to the determined second user identifier, use the determined presentation identifier as the presentation identifier corresponding to the second user; and if multiple presentation identifiers corresponding to the second user are determined according to the determined second user identifier, determine a language of the access content that needs to be returned to the first user, and determine, according to a correspondence between languages of access content and presentation identifiers of the second user, a presentation identifier corresponding to the language of the access content that needs to be returned to the first user.

Preferably, the access content further includes second user key information corresponding to the at least one second user identifier; and the server further includes: an information determining module configured to determine, according to a correspondence between a second user identifier and second user key information, the second user key information corresponding to the at least one second user identifier included in the access content.

The specification also provides another method for displaying webpage content. The method may include: receiving an access request of a first user to access a webpage; determining webpage content according to the access request of the first user; determining a second user identifier comprised in the webpage content based on the webpage content; determining a presentation identifier from one or more presentation identifiers corresponding to the second user according to the determined second user identifier and the webpage content, wherein the one or more presentation identifiers are configured to identify the corresponding second user; and returning the webpage content to the first user, wherein the webpage content comprises the determined presentation identifier corresponding to the determined second user identifier.

The specification further provides a system for displaying webpage content. The system may include one or more processors and a non-transitory computer-readable memory coupled to the one or more processors and configured with instructions executable by the one or more processors to perform operations. The operations may include: receiving an access request of a first user to access a webpage; determining webpage content according to the access request of the first user; determining a second user identifier comprised in the webpage content based on the webpage content; determining a presentation identifier from one or more presentation identifiers corresponding to the second user according to the determined second user identifier and the webpage content, wherein the one or more presentation identifiers are configured to identify the corresponding second user; and returning the webpage content to the first user, wherein the webpage content comprises the determined presentation identifier corresponding to the determined second user identifier.

In another aspect, the specification provides a non-transitory computer readable medium. The non-transitory computer readable medium may include program instructions executable by a computer to cause the computer to perform operations. The operations may include: receiving an access request of a first user to access a webpage; determining webpage content according to the access request of the first user; determining a second user identifier comprised in the webpage content based on the webpage content; determining a presentation identifier from one or more presentation identifiers corresponding to the second user according to the determined second user identifier and the webpage content, wherein the one or more presentation identifiers are configured to identify the corresponding second user; and returning the webpage content to the first user, wherein the webpage content comprises the determined presentation identifier corresponding to the determined second user identifier.

DETAILED DESCRIPTION OF EMBODIMENTS

In the embodiments of the present application, access content requested by a first user is determined according to an access request of the first user, a presentation identifier corresponding to a second user identifier included in the access content is determined, and the access content is returned to the first user, so that a peer end displays the received presentation identifier, thereby improving accuracy of information transmission, reducing the occurrence of interrupted access or repeated access of a user due to inaccurate information transmission, and reducing the resource waste caused for a computer system or an Internet system.

The embodiments of the present application are described in further detail below with reference to the accompanying drawings of the specification.

Figure 1:
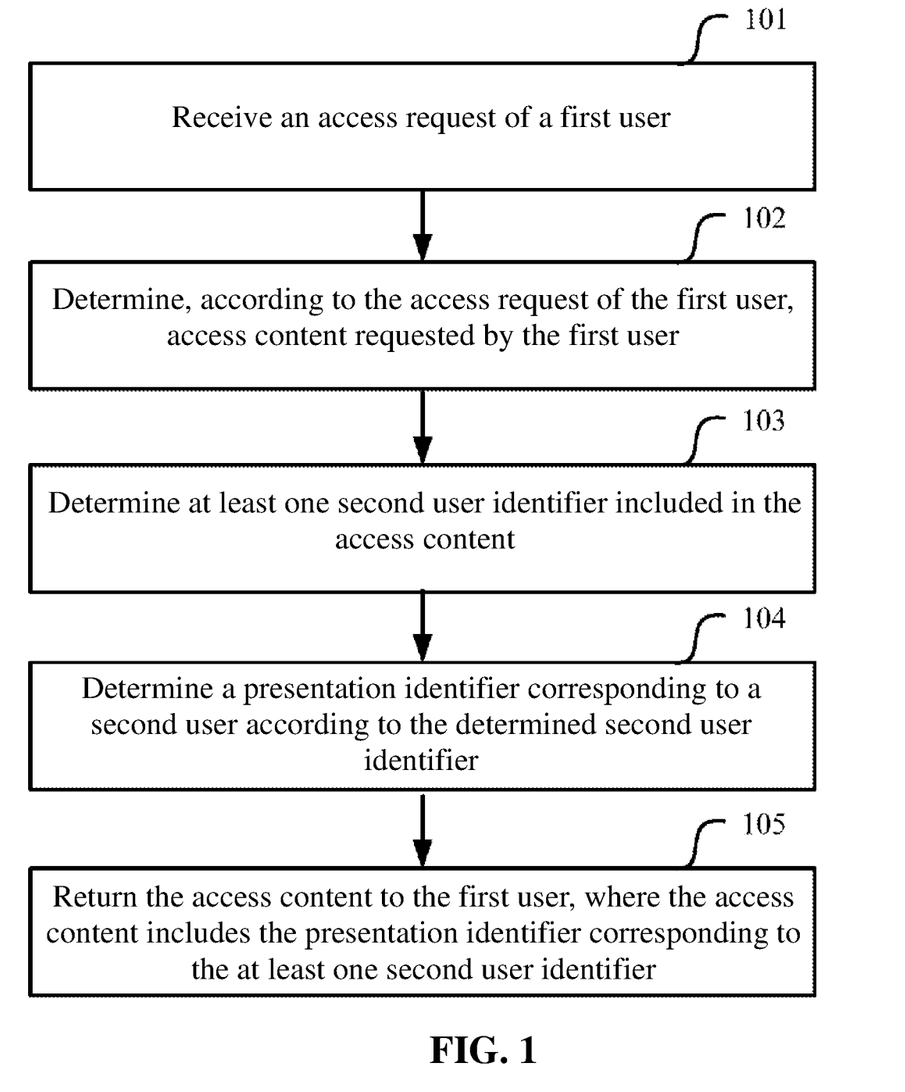
FIG. 1 illustrates a method for displaying access content according to Embodiment 1 of the present application.

As shown in FIG. 1, a method for displaying access content according to Embodiment 1 of the present application includes:

Step 101: An access request of a first user is received.

Step 102: Access content requested by the first user is determined according to the access request of the first user.

Step 103: At least one second user identifier included in the access content is determined.

Step 104: A presentation identifier corresponding to the second user is determined according to the determined second user identifier.

Step 105: The access content is returned to the first user, where the access content includes the presentation identifier corresponding to the at least one second user identifier.

The access request of the first user is an access request triggered when the first user opens a webpage. The webpage may be any webpage, for example, a payment page login request of the first user, a transaction information page viewing request of the first user, or the like.

In implementation, if the first user needs to open a webpage, for example, if the first user opens a webpage through a browser of a computer, mobile phone software, or the like, an access request may be sent to the server.

In Step 102, the access content requested by the first user is determined according to the access request of the first user. Different access requests correspond to different access content requested to be accessed. For example, if the first user needs to open a bill page, the access content generally includes content such as a transaction object, a transaction time, and a transaction amount.

In Step 103, when the at least one second user identifier included in the access content is determined, different webpage content may include different numbers of second users. For example, if the first user needs to query information about a transaction, the webpage content includes only one second user; if a page that the first user needs to open is a monthly bill, the webpage content includes second users related to all transactions in the queried month.

In different webpage content, the second user has different meanings. For example, if a transaction page needs to be opened, the second user is a specific merchant or a specific transaction party (which generally refers to an individual); if a contact page needs to be opened, the second user is a specific contact person.

When this embodiment of the present application is applied to different systems, the second user also has different meanings. For example, when this embodiment of the present application is applied to a payment system, the second user is a merchant.

Using an example in which a page that the first user needs to open is a monthly bill, it is determined that the monthly bill includes two transactions, for example, one transaction corresponds to a merchant A, and the other transaction corresponds to a merchant B. A second user identifier A corresponding to the merchant A and a second user identifier B corresponding to the merchant B are determined, and a presentation identifier A corresponding to the second user identifier A and a presentation identifier B corresponding to the second user identifier B are determined according to a correspondence between second user identifiers and presentation identifiers.

In implementation, if this embodiment of the present application is executed by a server, the correspondence between second user identifiers and presentation identifiers may be stored in the server, and may also be stored in another entity, for use in query by the server.

The presentation identifier in this embodiment of the present application may be a static picture, such as a merchant LOGO. A picture format may be a jpg format, a jpeg format, a png format, a bmp format or the like.

The presentation identifier may be a dynamic picture, for example, a picture in a gif format or the like.

The presentation identifier may be a video, for example, a video in an rmvb format, an avi format, a ts format or the like.

The second user identifier in this embodiment of the present application may be any information that can uniquely identify a second user. Different webpage content may correspond to different second user identifiers. For example, if a transaction page needs to be opened, the second user is a specific merchant, and the corresponding second user identifier is a merchant title.

In Step 104, an identity code identifier corresponding to the merchant can be found according to the determined merchant title, and the presentation identifier corresponding to the merchant can be determined according to the identity code identifier.

The identity code identifier (Mid, MERCHANT_ID) is a system identity code identifier allocated by the system to the second user; one second user has only one MID.

If the method in this embodiment of the present application is applied to a payment system, the system identity code identifier is information, which is allocated by the payment system to the second user, for identifying the second user.

During determination of the presentation identifier corresponding to the merchant, it is possible that the merchant has only one presentation identifier. Because consumers of the merchant may come from different countries, different languages of the access content may be needed. For example, an American consumer requires the language of the access content to be English, a Japanese consumer requires the language of the access content to be Japanese, and a Chinese consumer requires the language of the access content to be Chinese. For example, oriented to the Chinese consumer, the presentation identifier of the merchant A is information easily recognizable to the Chinese consumer; and oriented to the Japanese consumer, the presentation identifier of the merchant A is information easily recognizable to the Japanese consumer. Therefore, during determining of the presentation identifier corresponding to the merchant, it is possible that for a different language of the access content, the merchant corresponds to a respective presentation identifier.

Based on the foregoing content, in implementation, if one presentation identifier is determined during determining of the presentation identifier corresponding to the merchant, the presentation identifier may be used as the presentation identifier corresponding to the second user.

If multiple presentation identifiers are determined during determining of the presentation identifier corresponding to the merchant, it further needs to determine a language of the access content that needs to be returned to the first user, and select, according to a correspondence between languages of access content and presentation identifiers of the merchant, the presentation identifier corresponding to the second user from the determined multiple presentation identifiers.

For example, it is determined that the multiple presentation identifiers of the merchant A are a presentation identifier aa corresponding to Japanese, and a presentation identifier bb corresponding to Chinese, and in this case, a language of the access content that needs to be returned to the first user is determined; assuming that the language is Chinese, bb is selected as the presentation identifier corresponding to the second user.

If the presentation identifier corresponding to the language of the access content that needs to be returned to the first user cannot be determined according to the correspondence between languages of access content and presentation identifiers of the merchant, for example, the merchant only sets presentation identifiers corresponding to Japanese and Chinese but does not set a presentation identifier corresponding to English, in this case, a default presentation identifier set by the merchant may be used as the presentation identifier corresponding to the second user. For example, the merchant may specify a presentation identifier in the correspondence between languages of access content and presentation identifiers as a default presentation identifier, or may set a presentation identifier not existing in the correspondence between languages of access content and presentation identifiers as a default presentation identifier. If the merchant does not set a default presentation identifier, a presentation identifier may be randomly selected from a specified correspondence between languages of access content and presentation identifiers as a default presentation identifier.

To further improve the diversity of display, preferably, in addition to the presentation identifier, second user key information may further be determined. The second user key information is used for identifying a second user. For example, for a merchant, the second user key information may be an abbreviation of the merchant or another name of the merchant.

Specifically, after Step 103 and before Step 105, the method further includes:

determining, according to a correspondence between a second user identifier and second user key information, the second user key information corresponding to the at least one second user identifier included in the access content.

In Step 105, the access content returned to the first user further includes second user key information.

When the access content includes both the presentation identifier and the second user key information, the access content may be displayed in an assembled manner.

There may be many assembled display manners, for example, the second user key information and the presentation identifier may be arranged vertically or may be arranged horizontally. It is also possible that one piece of information is hidden, and when it is detected that a touch position of the first user is on one piece of information, the other piece of information is displayed. For example, the presentation identifier is hidden, and when the first user touches the displayed second user key information of the second user, the presentation identifier of the second user may be displayed.

The presentation identifier of the second user in this embodiment of the present application is uploaded by the second user to a network side and established by the network side for the second user.

In implementation, not every second user needs to set multiple presentation identifiers. Therefore, in implementation, an option supporting multiple languages may be set, and if the second user chooses to support multiple languages, the presentation identifier uploaded by the second user is bound with the languages of the access content that are selected by the second user.

If the second user does not choose to support multiple languages, the presentation identifier uploaded by the second user is bound with the system identity code identifier of the second user.

Specifically, in implementation, a multi-language option may be set.

If the second user checks this option, it is determined that the second user needs to use the multi-language option.

For the presentation identifier, an upload option corresponding to the presentation identifier is set.

For the language, the second user may input the language and/or a drop-down menu may be set for the second user to select the language.

In implementation, languages that the second user needs to use cannot be determined, and therefore, a language adding option may be set. If the second user chooses to add a language, a group of language input blocks and/or language selection options are added, and uploading options for corresponding presentation identifiers are added.

For example, if the second user checks to support multiple languages, the second user inputs a language: Chinese, and the presentation identifier is a picture A, a correspondence between Chinese and the picture A is established.

If the second user adds a language: English, and the presentation identifier is a picture B, a correspondence between English and the picture B is established.

For the second user key information, if the second user inputs the second user key information, the second user key information is bound with the second user identifier. The language of the second user key information may be any language.

If the presentation identifier is a static picture or a dynamic picture, in order to ensure storage space and a display speed of a client terminal, when the correspondence between the second user identifier and the presentation identifier is established, it may be required that the picture uploaded by the second user should not exceed 1 M.

If the presentation identifier is a video, in order to ensure storage space and the display speed of the client terminal, when the correspondence between the second user identifier and the presentation identifier is established, it may be required that the picture uploaded by the second user should not exceed 2 M.

To ensure a display effect, the second user key information is not longer than 12 characters.

Preferably, when the second user needs to query the presentation identifier and the second user key information uploaded by the second user, a query interface may be used to provide a batch query function.

In this embodiment of the present application, when the second user uploads the presentation identifier and the second user key information, it may be implemented by means of a service using terminal. The service using terminal may be a client terminal, or may be implemented by using other software or hardware that can log onto the server to establish the foregoing correspondence.

Hereinafter, a detailed description is provided by using an example in which the solution of the present application is applied to Alipay™.

Figure 2:
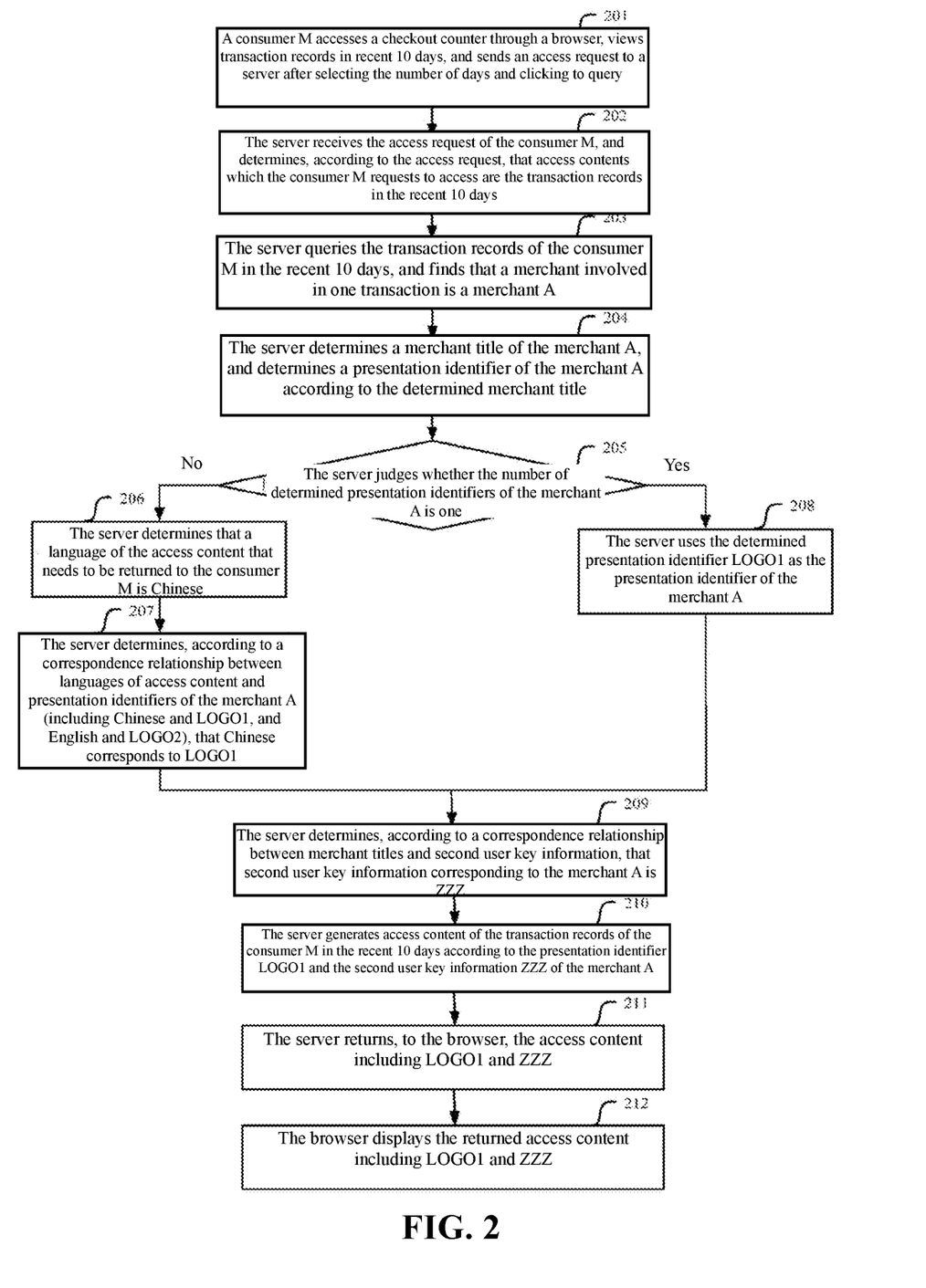
FIG. 2 illustrates a method for displaying access content according to Embodiment 2 of the present application.

As shown in FIG. 2, a method for displaying access content according to Embodiment 2 of the present application includes:

Step 201: A consumer M accesses a checkout counter through a browser, views transaction records in recent 10 days, and sends an access request to a server after selecting the number of days and clicking to query.

Step 202: The server receives the access request of the consumer M, and determines, according to the access request, that access contents which the consumer M requests to access are the transaction records in the recent 10 days.

Step 203: The server queries the transaction records of the consumer M in the recent 10 days, and finds that a merchant involved in one transaction is a merchant A.

Step 204: The server determines a merchant title of the merchant A, and determines a presentation identifier of the merchant A according to the determined merchant title.

Step 205: The server judges whether the number of determined presentation identifiers of the merchant A is one; if yes, the server performs Step 208; otherwise, the server performs Step 206.

Step 206: The server determines that a language of the access content that needs to be returned to the consumer M is Chinese.

Step 207: The server determines, according to a correspondence between languages of access content and presentation identifiers of the merchant A (including Chinese and LOGO1, and English and LOGO2), that Chinese corresponds to LOGO1, and performs Step 209.

Step 208: The server uses the determined presentation identifier LOGO1 as the presentation identifier of the merchant A.

Step 209: The server determines, according to a correspondence between merchant titles and second user key information, that second user key information corresponding to the merchant A is ZZ.

Step 210: The server generates access content of the transaction records of the consumer M in the recent 10 days according to the presentation identifier LOGO1 and the second user key information ZZZ of the merchant A.

Step 211: The server returns, to the browser, the access content including LOGO1 and ZZZ.

Step 212: The browser displays the returned access content including LOGO1 and ZZZ.

Based on the same inventive concept, an embodiment of the present application further provides a server. Because a problem solving principle of the server is similar to the method for displaying access content according to the embodiment of the present application, for the implementation of the server, reference may be made to the implementation of the method, and the repeated part is not described again.

Figure 3:
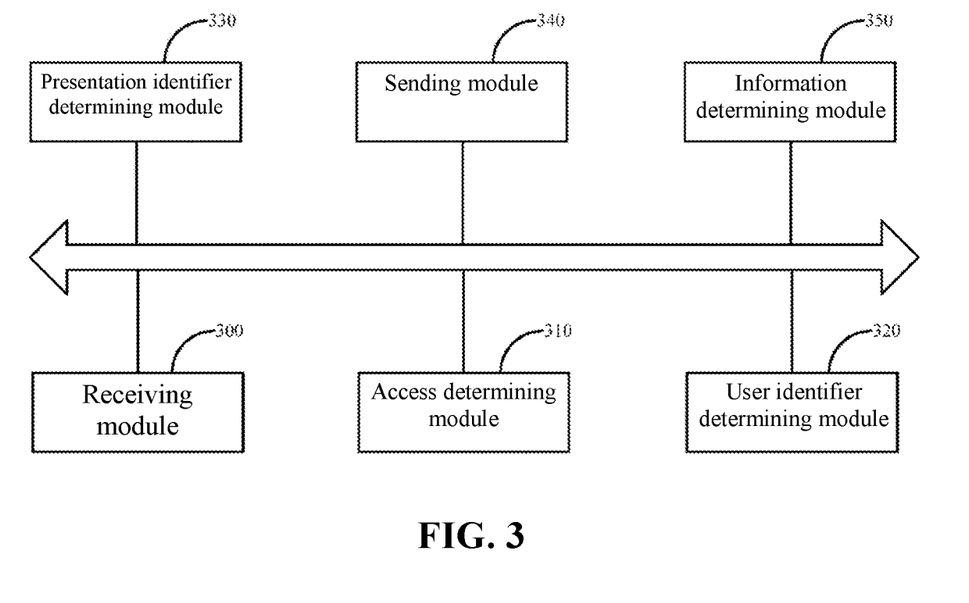
FIG. 3 is a schematic structural diagram of a server according to Embodiment 3 of the present application.

As shown in FIG. 3, a server according to Embodiment 3 of the present application includes: a receiving module 300, an access determining module 310, a user identifier determining module 320, a presentation identifier determining module 330, and a sending module 340.

The receiving module 300 is configured to receive an access request of a first user.

The access determining module 310 is configured to determine, according to the access request of the first user, access content requested by the first user.

The user identifier determining module 320 is configured to determine at least one second user identifier included in the access content.

The presentation identifier determining module 330 is configured to determine a presentation identifier corresponding to the second user according to the determined second user identifier.

The sending module 340 is configured to return the access content to the first user, where the access content includes the presentation identifier corresponding to the at least one second user identifier.

In implementation, different access requests correspond to different access content requested to be accessed. For example, if the first user needs to open a bill page, the access content generally includes content such as a transaction object, a transaction time, and a transaction amount.

When the user identifier determining module 320 determines at least one second user identifier included in the access content, different webpage content may include different numbers of second users. For example, if the first user needs to query information about a transaction, the webpage content includes only one second user; if a page that the first user needs to open is a monthly bill, the webpage content includes second users related to all transactions in the queried month.

In different webpage content, the second user has different meanings. For example, if a transaction page needs to be opened, the second user is a specific merchant or a specific transaction party (which generally refers to an individual); if a contact page needs to be opened, the second user is a specific contact person.

When this embodiment of the present application is applied to different systems, the second user also has different meanings. For example, when this embodiment of the present application is applied to a payment system, the second user is a merchant.

Using an example in which a page that the first user needs to open is a monthly bill, it is determined that the monthly bill includes two transactions, for example, one transaction corresponds to a merchant A, and the other transaction corresponds to a merchant B. A second user identifier A corresponding to the merchant A and a second user identifier B corresponding to the merchant B are determined, and a presentation identifier A corresponding to the second user identifier A and a presentation identifier B corresponding to the second user identifier B are determined according to a correspondence between second user identifiers and presentation identifiers.

In implementation, the correspondence between second user identifiers and presentation identifiers may be stored in the server, and may also be stored in another entity, for use in query by the server.

The presentation identifier in this embodiment of the present application may be a static picture, such as a merchant LOGO. A picture format may be a jpg format, a jpeg format, a png format, a bmp format or the like.

The presentation identifier may be a dynamic picture, for example, a picture in a gif format or the like.

The presentation identifier may be a video, for example, a video in an rmvb format, an avi format, a ts format or the like.

The second user identifier in this embodiment of the present application may be any information that can uniquely identify a second user. Different webpage content may correspond to different second user identifiers. For example, if a transaction page needs to be opened, the second user is a specific merchant, and the corresponding second user identifier is a merchant title.

Preferably, the presentation identifier determining module 330 is specifically configured to:

determine a corresponding system identity code identifier according to the determined second user identifier; and determine the presentation identifier corresponding to the second user according to the determined system identity code identifier.

The identity code identifier (Mid, MERCHANT_ID) is a system identity code identifier allocated by the system to the second user; one second user has only one MID.

If the method in this embodiment of the present application is applied to a payment system, the system identity code identifier is information, which is allocated by the payment system to the second user, for identifying the second user.

During determining of the presentation identifier corresponding to the merchant, it is possible that the merchant has only one presentation identifier. Because consumers of the merchant may come from different countries, different languages of the access content may be needed. For example, an American consumer requires the language of the access content to be English, a Japanese consumer requires the language of the access content to be Japanese, and a Chinese consumer requires the language of the access content to be Chinese. For example, oriented to the Chinese consumer, the presentation identifier of the merchant A is information easily recognizable to the Chinese consumer; and oriented to the Japanese consumer, the presentation identifier of the merchant A is information easily recognizable to the Japanese consumer. Therefore, during determining of the presentation identifier corresponding to the merchant, it is possible that for a different language of the access content, the merchant corresponds to a respective presentation identifier.

Based on the foregoing content, preferably, the presentation identifier determining module 330 is specifically configured to:

if one presentation identifier corresponding to the merchant is determined according to the determined second user identifier, use the determined presentation identifier as the presentation identifier corresponding to the second user; and if multiple presentation identifiers corresponding to the second user are determined according to the determined second user identifier, determine a language of the access content that needs to be returned to the first user, and determine, according to a correspondence between languages of access content and presentation identifiers of the second user, a presentation identifier corresponding to the language of the access content that needs to be returned to the first user.

For example, it is determined that the multiple presentation identifiers of the merchant A are a presentation identifier aa corresponding to Japanese, and a presentation identifier bb corresponding to Chinese, and in this case, a language of the access content that needs to be returned to the first user is determined; assuming that the language is Chinese, bb is selected as the presentation identifier corresponding to the second user.

If the presentation identifier corresponding to the language of the access content that needs to be returned to the first user cannot be determined according to the correspondence between languages of access content and presentation identifiers of the merchant, for example, the merchant only sets presentation identifiers corresponding to Japanese and Chinese but does not set a presentation identifier corresponding to English, in this case, a default presentation identifier set by the merchant may be used as the presentation identifier corresponding to the second user. For example, the merchant may specify a presentation identifier in the correspondence between languages of access content and presentation identifiers as a default presentation identifier, or may set a presentation identifier not existing in the correspondence between languages of access content and presentation identifiers as a default presentation identifier. If the merchant does not set a default presentation identifier, a presentation identifier may be randomly selected from a specified correspondence between languages of access content and presentation identifiers as a default presentation identifier.

To further improve the diversity of display, preferably, in addition to the presentation identifier, second user key information may further be determined. The second user key information is used for identifying a second user. For example, for a merchant, the second user key information may be an abbreviation of the merchant or another name of the merchant.

Preferably, the access content further includes second user key information corresponding to the at least one second user identifier; and the server further includes:

an information determining module 350 configured to determine, according to a correspondence between a second user identifier and second user key information, the second user key information corresponding to the at least one second user identifier included in the access content.

When the access content includes both the presentation identifier and the second user key information, the access content may be displayed in an assembled manner.

There may be many assembled display manners, for example, the second user key information and the presentation identifier may be arranged vertically or may be arranged horizontally. It is also possible that one piece of information is hidden, and when it is detected that a touch position of the first user is on one piece of information, the other piece of information is displayed. For example, the presentation identifier is hidden, and when the first user touches the displayed second user key information of the second user, the presentation identifier of the second user may be displayed.

The present application is described with reference to the block diagram and/or flowchart of the method, apparatus (system), and/or computer program product according to the embodiments of the present application. It should be understood that computer program instructions may be used to implement a block in the block diagram and/or flowchart and a combination of blocks in the block diagram and/or the flowchart. These computer program instructions may be provided for a processor of a general-purpose computer or a special-purpose computer, and/or other programmable data processing apparatuses to generate a machine, so that the instructions executed by a computer processor and/or other programmable data processing apparatuses generate a method for implementing a specified function/action in the block in the block diagram and/or the flowchart.

Correspondingly, the present application may also be implemented by using hardware and/or software (including firmware, resident software, microcode, and the like). Further, the present application may employ the form of a computer program product on a computer usable or computer readable storage medium, which includes computer usable or computer readable program code implemented in the medium, to be used by an instruction execution system or used in combination with the instruction execution system. In the context of the present application, the computer usable or computer readable medium may be any medium, which may include, store, communicate, transmit, or deliver a program, and may be used by an instruction execution system, apparatus or device, or used in combination with the instruction execution system, apparatus or device.

Apparently, a person skilled in the art may make various modifications and variations on the present application without departing from the spirit and scope of the present application. Hence, if these modifications and variations of the present application belong to the scope of the claims of the present application and the equivalent technology thereof, the present application is also intended to cover these modifications and variations.

The invention claimed is:

1. A method for displaying webpage content, the method comprising:
   receiving an access request of a first user to access a webpage;
   determining webpage content according to the access request of the first user;
   determining a user identifier for identifying a second user comprised in the webpage content based on the webpage content;
   determining key information of the second user according to the determined user identifier;
   selecting a presentation identifier from one or more presentation identifiers corresponding to the second user according to the determined user identifier and the webpage content, wherein the one or more presentation identifiers include at least one picture for identifying the corresponding second user;
   returning the webpage content including the determined key information and the selected presentation identifier to the first user;
   displaying the key information to the first user and hiding the presentation identifier from display; and
   when a touch position of the first user is on the displayed key information, displaying the presentation identifier to the first user.

2. The method according to claim 1, wherein the selecting a presentation identifier from one or more presentation identifiers corresponding to the second user according to the determined user identifier and the webpage content comprises:
   determining a corresponding system identity code identifier according to the determined user identifier; and
   determining the presentation identifier corresponding to the second user according to the determined system identity code identifier.

3. The method according to claim 1, wherein the selecting a presentation identifier from one or more presentation identifiers corresponding to the second user according to the determined user identifier and the webpage content comprises:
   determining a language of the webpage content that needs to be returned to the first user, and determining, according to a correspondence between languages of webpage content and presentation identifiers of the second user, the presentation identifier corresponding to the language of the webpage content that needs to be returned to the first user.

4. The method according to claim 1, wherein the determining key information of the second user according to the determined user identifier comprises:
   after the determining the user identifier comprised in the webpage content and before the returning the webpage content to the first user,
   determining, according to a correspondence between the user identifier and the key information, the key information of the second user corresponding to the user identifier comprised in the webpage content.

5. The method according to claim 1, wherein the method is performed by a payment system, and the user identifier is a merchant title.

6. The method according to claim 1, wherein the webpage content comprises a plurality of user identifiers, and the method comprises:
   determining a presentation identifier corresponding to each second user based on the webpage content; and
   returning the webpage content to the first user with the determined presentation identifier corresponding to each second user.

7. The method according to claim 1, wherein the determined presentation identifier comprises a dynamic picture for identifying the second user.

8. A system for displaying webpage content, comprising one or more processors and a non-transitory computer-readable memory coupled to the one or more processors and configured with instructions executable by the one or more processors to perform operations comprising:
   receiving an access request of a first user to access a webpage;
   determining webpage content according to the access request of the first user;
   determining a user identifier for identifying a second user comprised in the webpage content based on the webpage content;
   determining key information of the second user according to the determined user identifier;
   selecting a presentation identifier from one or more presentation identifiers corresponding to the second user according to the determined user identifier and the webpage content, wherein the one or more presentation identifiers include at least one picture for identifying the corresponding second user;
   returning the webpage content including the determined key information and the selected presentation identifier to the first user;
   displaying the key information to the first user and hiding the presentation identifier from display; and
   when a touch position of the first user is on the displayed key information, displaying the presentation identifier to the first user.

9. The system according to claim 8, wherein the selecting a presentation identifier from one or more presentation identifiers corresponding to the second user according to the determined user identifier and the webpage content comprises:
   determining a corresponding system identity code identifier according to the determined user identifier; and
   determining the presentation identifier corresponding to the second user according to the determined system identity code identifier.

10. The system according to claim 8, wherein the selecting a presentation identifier from one or more presentation identifiers corresponding to the second user according to the determined user identifier and the webpage content comprises:
    determining a language of the webpage content that needs to be returned to the first user, and determining, according to a correspondence between languages of webpage content and presentation identifiers of the second user, the presentation identifier corresponding to the language of the webpage content that needs to be returned to the first user.

11. The system according to claim 8, wherein the determining key information of the second user according to the determined user identifier comprises:
    after the determining the user identifier comprised in the webpage content and before the returning the webpage content to the first user,
    determining, according to a correspondence between the user identifier and the key information, the key information of the second user corresponding to the user identifier comprised in the webpage content.

12. The system according to claim 8, wherein the webpage content comprises a plurality of user identifiers, and the operations comprise:
    determining a presentation identifier corresponding to each second user based on the webpage content; and
    returning the webpage content to the first user with the determined presentation identifier corresponding to each second user.

13. The system according to claim 8, wherein the determined presentation identifier comprises a dynamic picture for identifying the second user.

14. A non-transitory computer readable medium comprising program instructions executable by a computer to cause the computer to perform operations comprising:
    receiving an access request of a first user to access a webpage;
    determining webpage content according to the access request of the first user;
    determining a user identifier for identifying a second user comprised in the webpage content based on the webpage content;
    determining key information of the second user according to the determined user identifier;
    selecting a presentation identifier from one or more presentation identifiers corresponding to the second user according to the determined user identifier and the webpage content, wherein the one or more presentation identifiers include at least one picture for identifying the corresponding second user;

returning the webpage content including the determined key information and the selected presentation identifier to the first user;

displaying the key information to the first user and hiding the presentation identifier from display; and when a touch position of the first user is on the displayed key information, displaying the presentation identifier to the first user.

15. The non-transitory computer readable medium according to claim 14, wherein the selecting a presentation identifier from one or more presentation identifiers corresponding to the second user according to the determined user identifier and the webpage content comprises:

determining a corresponding system identity code identifier according to the determined user identifier; and determining the presentation identifier corresponding to the second user according to the determined system identity code identifier.

16. The non-transitory computer readable medium according to claim 14, wherein the selecting a presentation identifier from one or more presentation identifiers corresponding to the second user according to the determined user identifier and the webpage content comprises:

determining a language of the webpage content that needs to be returned to the first user, and determining, according to a correspondence between languages of webpage content and presentation identifiers of the second user, a presentation identifier corresponding to the language of the webpage content that needs to be returned to the first user.

17. The non-transitory computer readable medium according to claim 14, wherein the determining key information of the second user according to the determined user identifier comprises:

after the determining the user identifier comprised in the webpage content and before the returning the webpage content to the first user, determining, according to a correspondence between the user identifier and the key information, the key information of the second user corresponding to the user identifier comprised in the webpage content.

18. The non-transitory computer readable medium according to claim 14, wherein the user identifier is a merchant title.

19. The non-transitory computer readable medium according to claim 14, wherein the webpage content comprises a plurality of user identifiers, and the operations comprise:

determining a presentation identifier corresponding to each second user based on the webpage content; and returning the webpage content to the first user with the determined presentation identifier corresponding to each second user.

20. The non-transitory computer readable medium according to claim 14, wherein the determined presentation identifier comprises a dynamic picture for identifying the second user.

\* \* \* \* \*